(12) United States Patent
Kiuchi et al.

(10) Patent No.: US 7,938,330 B2
(45) Date of Patent: May 10, 2011

(54) METHODS AND EXECUTION PROGRAMS FOR READING AND DISPLAYING A TWO-DIMENSIONAL CODE

(76) Inventors: Yutaka Kiuchi, Hiratsuka (JP); Kohshiro Inomata, Hadano (JP)

( * ) Notice: Subject to any disclaimer, the term of this patent is extended or adjusted under 35 U.S.C. 154(b) by 1595 days.

(21) Appl. No.: 10/554,723

(22) PCT Filed: Apr. 23, 2004

(86) PCT No.: PCT/JP2004/005862
§ 371 (c)(1),
(2), (4) Date: Oct. 27, 2005

(87) PCT Pub. No.: WO2004/097717
PCT Pub. Date: Nov. 11, 2004

(65) Prior Publication Data
US 2007/0051813 A1   Mar. 8, 2007

(30) Foreign Application Priority Data
May 2, 2003   (JP) ................... 2003-127340

(51) Int. Cl.
*G06K 7/14* (2006.01)
(52) U.S. Cl. ...................................... 235/454

(58) Field of Classification Search .............. 235/454, 235/494
See application file for complete search history.

(56) References Cited

U.S. PATENT DOCUMENTS

| 5,355,001 A | 10/1994 | Fujimoto et al. |
| 5,541,396 A * | 7/1996 | Rentsch ............... 235/454 |
| 5,568,555 A * | 10/1996 | Shamir ................ 380/51 |
| 6,364,209 B1 | 4/2002 | Tatsuta et al. |

FOREIGN PATENT DOCUMENTS

| JP | 3-245283 | 10/1991 |
| JP | 5-54214 | 3/1993 |
| JP | 7-254037 | 10/1995 |
| JP | 8-30977 | 2/1996 |
| JP | 2000-235617 | 8/2000 |

* cited by examiner

*Primary Examiner* — Jamara A Franklin
(74) *Attorney, Agent, or Firm* — Westerman, Hattori, Daniels & Adrian, LLP

(57) ABSTRACT

A method for reading and displaying a two-dimensional code is to enable the display of digital information with high cell density and to enable an accurate reading of digital information, while responding to the various conditions. An image pattern that can be distinguished from surrounding cells is detected from an image data containing the two-dimensional code by verifying an image on the image data with a predetermined verification pattern. The detected image pattern includes the image of one or more data marks.

8 Claims, 10 Drawing Sheets
(1 of 10 Drawing Sheet(s) Filed in Color)

| Area Coverage (%) | Monochrome | | Color | |
|---|---|---|---|---|
| | Displayed on LCD | Printed on Paper | Displayed on LCD | Printed on Paper |
| 50 | — | — | ○ | ○ |
| 40 | ○ | ○ | ○ | × |
| 30 | ○ | ○ | ○ | × |
| 20 | ○ | × | × | × |
| 10 | ○ | × | — | — |
| 5 | × | × | — | — |

| Distance (um) | Flatbed Scanner | Digital Camera |
|---|---|---|
| 254 | ○ | ○ |
| 127 | ○ | ○ |
| 84 | ○ | × |
| 42 | ○ | × |
| 21 | × | × |
| 10 | × | × |

| Ratio (%) | Glossy Paper | Plain Paper |
|---|---|---|
| 125 | × | × |
| 100 | ○ | × |
| 80 | ○ | ○ |
| 60 | ○ | ○ |
| 50 | ○ | ○ |
| 40 | ○ | ○ |
| 30 | ○ | ○ |
| 20 | ○ | × |
| 15 | ○ | × |
| 10 | × | × |

METHODS AND EXECUTION PROGRAMS FOR READING AND DISPLAYING A TWO-DIMENSIONAL CODE

BACKGROUND OF THE INVENTION

1. Technical Field

This invention relates to method and execution program for reading and displaying a two-dimensional code that enable the reconstruction of prescribed digital information expressed in the two-dimensional code, through computer analysis of the two-dimensional code in image data obtained from an image-capturing device such as a camera or a scanner. The two-dimensional code referred to in this invention is either outputted from a recording device to sheet-like recording media or a solid object surface, or displayed on a display device.

2. Related Arts

A two-dimensional code is generally composed of a number of cells arranged in a lattice pattern and positioning symbols disposed around the cells, and is used to express digital information on a flat surface. The cells are envisioned on a white flat surface and composed of two types of cells: 1) marked cells with a black data mark on each cell and 2) white blank cells without any data marks. In a two-dimensional code, digital information is expressed by a formation of a layout pattern denoted by two types of cells. For example, by substituting the marked cells to 1 and the blank cells to 0, the digital information is expressed on a surface by binary data string of 1 and 0.

For a two-dimensional code represented in such a way, image data is obtained by using an image-capturing device and the digital information is reconstructed by analyzing the obtained image data. By using a computer for analyzing, the position of the cells in image data is calculated, and the displayed cells is detected on its position. As a result, the displayed cells are distinguished and the binary data string expressed in a two-dimensional code is reconstructed.

In doing so, the position of cells is calculated based on the positioning symbols denoted at a given fixed location. For example, the size and the orientation of a two-dimensional code in image data is obtained by detecting the distance and the angle between more than two detected positioning symbols, and based on this information, a method for calculating the position of each cell is known (Japanese Patent Publication No. 254037/1995, JIS X0510 Two-dimensional code symbol-QR code-Basic specification).

Furthermore, the display of cells is detected by the pixel tone value (gray level) at the approximate center of a cell. In other word, the pixel tone at the center of a cell is compared to a preliminarily set threshold value, and the pixel tone that is darker than the threshold value is considered as a marked cell and the lighter one is considered as a blank cell.

A two-dimensional code, by expressing digital information two-dimensionally on a display surface, can provide a representation with a higher density than a conventional bar code. In other words, with a two-dimensional code, a large amount of information can be represented on a display surface of a limited capacity. Due to such a feature, two-dimensional codes have been utilized in various ways in recent years.

For example, two-dimensional codes record digital information such as textual information, numerical information, image information, audio information, crypto information and computer command codes, onto sheet-like media like a paper and surfaces of solid objects like an electronic component, which are used for reconstructing such digital information after obtaining an image from an image-capturing device. Furthermore, it is used to transfer information between devices by reconstructing the digital information from a two-dimensional code taken by an image-capturing device and shown on a display device.

Along with technological progress in the acceleration of computer processing speed and the augmentation of recording media capacity, a larger amount of digital information is treated today than with the technology of the past. In addition, along with the progress in communications technology, the network environment that allows easy transmission of such digital information is created. For that reason, it is possible to handle information in various situations independent of time and space constraints.

Also for a two-dimensional code, it is required to display a large amount of digital information with higher density than previously. Moreover, it is required to treat such a high density two-dimensional code in various situations, by using input-output devices. Herewith, there is hope to handle digital information even more easily and more comfortably.

In order to increase the density of the display of a two-dimensional code, it is necessary to make the size of each cell small and to increase the number of cells per unit area. However, as the cell size becomes smaller, a problem of misalignment is likely to occur when determining the cell display. At the same time, the cell display is likely to become unclear and the pixel tone degree inaccurate for determining the display. This inaccuracy of the pixel tone degree occurs notably with a colored two-dimensional code that has colored cells. As a result, an error occurs when determining the display of a cell, and the digital information cannot be reconstructed accurately.

Such misalignment and inaccurate pixel tone degree are thought to be caused by a distortion of the image data surface occurring from the fluctuation of image-capturing conditions. During the output of a two-dimensional code, such misalignment and inaccuracy can occur, for example, when the output interval is miscalculated by the output device or when a display surface has any curvature. Moreover, during the input of a two-dimensional code, such misalignment can be caused by an optical distortion of the camera lens or by an incorrect orientation of a shooting angle.

In order to solve the problem of misalignment, the following method is known: to display the timing cell consisting of marked cells and blank cells that are located alternately around the area where the data cells are aligned and to adjust the position of the data cells by referring to the edges of the timing cells (Japanese Patent Publication No. 254037/1995). However, even with this method, a problem of misalignment is likely to occur with the data cells that are far from the timing cells. If the number of the timing cells is increased to prevent such misalignment, the number of data cells containing information will be decreased, and therefore, it is not enough to have a higher density of information.

On the other hand, in order to solve the problem of inaccurate pixel tone degree, the following method is known: to calculate the average pixel tone degree of the entire image data and to use this value as the threshold value of display determination (JIS X0510 Two-dimensional code symbol-QR code-Basic specification). With this method, it is possible to determine the display by considering the fluctuation of the pixel tone degree of the entire image occurring from the fluctuation of the input-output conditions. However, with this method, if there is a distortion of the pixel tone degree within the image surface, there can be inaccuracy in the pixel tone degree in different areas. Therefore, it is not enough to solve this problem with this method.

This invention was achieved as a result of thorough consideration of said challenges. The purpose of this invention, "Method and Execution Program for Reading and Displaying a Two-dimensional code", is to enable the display of digital information with high cell density and to enable an accurate reading of digital information, while responding to the various conditions described above.

SUMMARY OF THE INVENTION

The reading method for a two-dimensional code according to an aspect of the present invention is a reading method for a two-dimensional code with digital information expressed by displays on a plurality of cells arrayed two-dimensionally, comprising a feature of detecting an image pattern that can be distinguished from surrounding cells containing the display of a cell on the image data containing said two-dimensional code.

Said image pattern is composed of a two-dimensional pattern consisting of pixels in the image data and includes partial or whole cell display. For detecting the image pattern, a certain definite area of image data is verified with a predetermined pattern (verification pattern), and the verified image is assessed whether it has a desired pattern. By scanning image data through a repeated process of verification and determination, said repeated image pattern is detected from the cell area containing digital information (FIG. 10).

Another aspect of the present invention relates to the reading method of a two-dimensional code as mentioned above, further characterized by the following: the above image pattern includes the pattern of a mark surrounded by a blank area, and the image pattern can be detected by distinguishing a contrast between a marked area and a blank area.

By being surrounded by a blank area, each data mark on cells can be detected from the data marks displayed on the surrounding cells, and even if data marks are displayed in succession, they can also be detected individually (FIG. 4, FIG. 5). By detecting all of the data marks within the cell area, non-detected cells are regarded as blank cells and thus it is possible the display of all the cells becomes clear.

The data mark displayed on the cell forms a particular pattern on that area (marked area). As the pattern, it is possible to think of a quadrangular or a circular pattern (FIG. 4, FIG. 6). In addition, the marked area is displayed with a contrast to the blank area in their pixel tone degree, and the pixel tone degree of the marked area can either be higher or lower.

For detecting a data mark from the image data, the image is first verified with a verification pattern that includes a datamark pattern, and its data mark is detected and determined. At this point, the determination process occurs based on detecting the contrast between the marked area and the blank area. In other words, the determination process occurs, for example, by considering that the higher the pixel tone is in the marked area and the lower it is in the blank area, the higher the adequacy of the data mark. It is also possible to have a determination process that considers the data mark to be more adequate if their pixel tone is closer to that of a prescribed image pattern, and in this case, the image that is being determined can be composed of more than three areas (FIG. 18).

The value of the pixel tone degree of each area (marked area and blank area) of the verified image is calculated by using a prescribed method, such as the use of average or median value of all the pixels that compose an area. Furthermore, in order to shorten the time required for a determination process, it is possible to calculate the value of the pixel tone degree by thinning out the pixels within the area.

Yet another aspect of the present invention relates to the reading method of a two-dimensional code as mentioned above, further characterized by the following: the position of the cell is calculated according to the detected positions of the image patterns and the display of the cell is determined on the above position.

When a data mark is detected from the image data, a display of its cell becomes clear at the same time as a position of the cell on the image data. At this point, data marks on the cell area with relatively little distortion for their images can be first detected and used as standards for calculating positions of other cells. It is possible to accurately calculate the positions of the cells by this method since many data marks are located on the cell area. Furthermore, by determining displays of the cells on the calculated positions, it becomes possible to prevent determination errors.

Among the data marks detected from the image data, there are those with some degree of misalignment. Accordingly, It is preferable to determine the regression lines of cells in arrayed direction from plural data marks and to calculate positions of cells at the intersecting points of these regression lines.

It is preferable to array cells in square lattices, and in such case, the cell formed from the boundary of the adjacent cells have a square shape. Furthermore, cells may also be arrayed in hexagonal lattices, and in such case, this cell has a hexagonal shape. Notably, density for displays of the cells becomes higher, when round data marks are displayed on the arrayed cells in hexagonal lattices (FIG. 6).

To calculate the regression lines, heretofore known method such as a method of least squares can be used. In this case, in view of distortion within the image, it is suitable to use a method of least squares weighted with distances from the cell. Also, in order to handle distortion of the image, it is possible to calculate by regression to a curve such as a quadratic curve.

The reading method for a two-dimensional code according to another aspect of the present invention is a reading method for a two-dimensional code with digital information expressed by displays on a plurality of cells arrayed two-dimensionally, comprising features of: image information is obtained by detecting a prescribed image pattern on image data containing said two-dimensional code; and an image is detected by using the above image information.

Image information is retrieved by detecting a two-dimensional image pattern existing in image data. Thus, it is possible to effectively retrieve highly accurate information. In other words, even if the displaying size of the image pattern where information is retrieved is small, an error caused by misalignment will not be included. Furthermore, in order to retrieve image information from the same image data, it is possible to detect images according to each image data, in consideration of image fluctuation that occurs during inputting and outputting process. Image information such as a mean value of its tone degree, a median value or a standard deviation is retrieved from a given image.

When retrieving image information, it is preferable to first display one or more reference marks and then to retrieve information from that image(s). The reference mark can be displayed by setting up a predetermined type of display for a given cell. There is an advantage here that the reference mark is displayed near the detected image. It is preferable to compose the pattern of the reference mark with the same pattern as that of data marks that expresses digital information. Thus, there will not be a deviance of information caused by a difference of the pattern for size or form. Furthermore, it is possible to use the reference mark as a standard position for deciding the position of cells.

On the other hand, image information may be retrieved from the image of positioning symbols. In this case, since there is no special need to display the image in order to retrieve image information, and since the standard positions and the image information can be retrieved jointly, it is therefore possible to use display space effectively. On the other hand, image information may be retrieved from the image of detected data marks. In other words, data marks with less distortion may be detected first and then used for detecting other undetected data marks. In this case, it is possible to acquire highly accurate information, since the display space is used effectively and also since it is retrieved from the same pattern on the same area.

The retrieved image information can be used for detecting data marks on cells. More precisely, the image may be verified with a verification pattern and the image information is used as an indicator for determining the correctness of the data marks. Furthermore, it may be used as an indicator for determining the display of cells on already identified positions.

The reading method for a two-dimensional code according to another aspect of the present invention is a reading method for a two-dimensional code with digital information expressed by displays on a plurality of cells arrayed two-dimensionally, comprising a feature of: detecting an image pattern that can be distinguished from surrounding cells combining the display of plural cells on image data containing said two-dimensional code.

The image pattern that is being detected can be an image containing only one data mark, or can be an image containing plural data marks in aggregates. The data mark displayed in the cell can cover the entire cell area, and in this case, though it is not possible to detect individually data marks that are displayed in succession, it is possible if the aggregates consist of a plurality of cells. For example, if it is an image of marked cells surrounded by blank cells (FIG. 28-30), it is possible to detect the cells from their surroundings. This type of image patterns generally exist in plurality in the cell area, and such images are detected and used.

The displaying method for a two-dimensional code according to another aspect of the present invention is a displaying method for a two-dimensional code with digital information expressed by displays on a plurality of cells arrayed two-dimensionally, comprising a feature of: the display of the cell is constructed by an image pattern that can be distinguished from surrounding cells.

Another aspect of the present invention relates to the displaying method of a two-dimensional code as mentioned above, further characterized by the following: the above image pattern includes a pattern of a mark surrounded by a blank area, and is displayed with an enough contrast between a mark area and a blank area for detection.

When recording a two-dimensional code on recording media, cells are usually assumed white, same color as that of recording media itself. A recording device output black data marks on said cells. Thus, the cell is expressed in two ways, either black or white depending on the existence or non-existence of the data mark. It is also possible to adjust pixel tones and output gray data marks, tones that are in between white and black. In this case, the data mark on the cell is expressed in plural types of a tone that bear predetermined tone intervals. Moreover, a colored recording device may output colored data marks. In this case, the data mark on the cell has plural types of colored display expressed by combinations of color components of a recording device.

Display devices used for expressing a two-dimensional code are usually composed of aggregates of plural luminescent materials, and express images with their luminance. It is possible to display black (or gray or colored) data marks on supposedly white cells when displaying a two dimensional code on a display device, in similar way as on a recording device. It is also possible, on the contrary, to display white (or gray or colored) data marks on supposedly black cells. In case of the display device, since the white color is expressed by the luminance of the luminescent materials, the data mark tends to expand when that is white. Thus, there is an advantage of determination error occurring less when the cells are expressed in non-luminescent color, black, and when the data marks are expressed in a luminescent color such as white.

Depending on the type of the output device, it is possible to bifurcate by setting the cells white when using the recording device to output the images on recording media or setting the cells black (inversion of images) when using the display device.

The contrast of tone between the marked area and the blank area should be displayed sufficiently since it is the indicator for detecting an image of the data mark. If the contrast is insufficient and there is a circumstance where distortion of the image is caused by the fluctuation of the conditions, it is not possible to detect the data mark with certainty. Moreover, it would not be possible to determine properly when determining the display of the cell.

Thus, in the case of a monochrome two-dimensional code where the data marks are displayed in a simple color, black, the marked areas should be displayed with a tone degree of equal to or greater than 10%. It is additionally desirable to display marked area with a tone degree of at least 30% or more. The above phenomenon occurs more prominently with the stricter determination conditions of the data marks displayed in colors in a colored two-dimensional code. Therefore, the marked areas of colored images should be displayed with a tone degree of equal to or greater than 30%. It is additionally desirable to display them with a tone degree of at least 50% or more.

When expressing data marks of a monochrome two-dimensional code by simultaneously using plural types of tone degrees, there should be at least 10% or more of an interval between each tone degree. It is additionally desirable to display the data marks with at least 30% or more of a tone degree interval. When displaying data marks of a colored two-dimensional code, there should be at least 30% or more of an interval between each tone degree. It is additionally desirable to display the data marks with at least 50% or more of a tone degree interval.

Yet another aspect of the present invention relates to the displaying method of a two-dimensional code as mentioned above, further characterized by the following: the distance of the blank area existing between two marks is equal to or greater than 42 micro-meters, and it is also equal to or greater than 15% while also being equal to or less than 100% of width of its said marks.

The original images of a two-dimensional code may be displayed with some distortions caused by various factors, such as blurriness occurring when displaying the images on a display device, or a smear occurring when outputting them from a recording device onto a sheet of paper. Furthermore, when capturing the images of a two-dimensional code, various distortions of the images may occur, such as an optical distortion caused by an image-capturing device or a defocusing blur caused when capturing the image. The data marks displayed by the image data may contain distortions such as enlargement or reduction in their size and misalignment for their positions. In this case, the images become more indistinct, and it becomes difficult to detect each data mark individually. Furthermore, the enlargement of the size and misalignment of the position for a data mark can also interfere with the cells surrounding the data mark and cause detection errors. This phenomenon notably occurs in the case of a color two-dimensional code because there are various types of displayed patterns that require higher accuracy for the detection, and because there are peculiar problems to color images such as color drift.

In order to prevent these problems, the blank area between data marks should be displayed with the interval of at least 42 micrometers or more. Moreover, it is additionally desirable considering cases with low resolution to display data marks with a distance of 127 micrometers or more between them. The distance of the blank area disposed between data marks mentioned here indicates the shortest distance of the blank area that exists between two data marks positioned in succession.

The distance of the blank area between data marks should be consistently 15% or more and 100% or less than the width of data marks (formula: [the distance of the blank area]/[the width of a data mark]×100). Moreover, considering the conditions where image distortion can easily occur, it is desirable to have said distance to be consistently 30% or more and 80% or less. The width of data marks in question is the greatest width of marked area surrounded by blank area.

When expressing the blank area around data marks, it is possible to relatively reduce the area of data marks (black, gray or color). As a result, the area with the same color as the background increases and there will be an advantage for the two-dimensional code being displayed beautifully, as it becomes more in harmony with its surroundings. This aspect is more notable with variety of displays than with a monochrome display, because the ratio of blank cells to marked cells is lower. Especially, with the colored two-dimensional code, this effect is more notable, because the data marks are displayed in various colors.

Yet another aspect of the present invention relates to the displaying method of a two-dimensional code as mentioned above, further characterized by the following: displaying a reference mark containing a same image pattern as the marks on cells expressing digital information on prescribed cells.

Reference mark(s) are displayed for retrieving image information from the image of said mark(s). Herewith, with consideration of image fluctuation during inputting and outputting process, they are used to detect data marks on cells or to determine the display of the cells. Notably, in case of a colored two-dimensional code with plural kinds of the display of cells, the reference mark(s) have a greater effect because a highly accurate threshold value is needed for determining the display. It is also possible to use the detected position of the reference mark as a standard position for deciding the position of the cells.

On the image data, in addition to the distortion of the shape within an image, there may be also a deviation of the pixel tone. Therefore, it is desirable to retrieve image information from an image positioned near the data marks. The reference mark has an advantage by being arrayed within the cell area. Plural reference marks are preferably displayed with a predetermined interval, and thus, there will be less affect of a pixel tone deviation.

Since there is a deviation of a pixel tone near a boundary of the marked area and the blank area on image data in general, the retrievable image information will be different depending on the area that is envisioned. Accordingly, it is desirable that the reference mark can reproduce any feature of pixel tones with smear existing in data marks on each cell. Thus, the reference mark(s) in this invention are displayed in the same pattern as that of data marks to express information. When the reference mark(s) are displayed in the same pattern as data marks, the display(s) of the reference mark(s) fit harmoniously, and the design can be highly uniform.

It is desirable to prepare reference marks for all types of the displays (colors, pixel tones) of cells. It is also possible to display only for the color components retained by an output device (for example, cyan, magenta, and yellow). Furthermore, it is also possible to prepare reference mark(s) only for the color(s) that are likely to cause determination errors. For example, it is possible to display only for magenta and yellow, or only for magenta.

The reading method for a two-dimensional code according to another aspect of the present invention is a reading method for a two-dimensional code with digital information expressed by colored displays on a plurality of cells arrayed two-dimensionally and for colored image data containing said two-dimensional code constituted by each pixel retaining a plurality of color components, comprising a feature of: detecting an image pattern that can be distinguished from surrounding cells containing color display of cells.

With a colored image data, in general, pixel tones for the number of color components are kept on each pixel, and these pixel tones are combined to express colors. It is preferable to have additive color mixture such as red, green and blue as color components of image data. They can also be composed of subtracting color mixture such as cyan, magenta and yellow, or other color components. The color display of cells is expressed by combining color components contained in each pixel. For example, eight colors including black, cyan, magenta, yellow, red, green, blue, and white can be expressed. As described above, by combining color components in each pixel, there can be many types of a display on each cell in a colored two-dimensional code.

Digital information is generally composed of a binary data row containing 0 and 1, and is expressed by a combination of its displays on each cell in a two-dimensional code. A colored two-dimensional code has more types of a display than a monochrome two-dimensional code having only two types of a display (black and white), and can express much more digital information than the monochrome two-dimensional code. Moreover, a plurality of tone may be expressed in each color component, and in this case, the types of a display that can be expressed increase more in number and thus, a greater amount of digital information can be expressed.

As for a colored two-dimensional code, the display of all cells can become clear by detecting all data marks, in the same way as a monochrome two-dimensional code. It is also possible to calculate a cell position based on positions of detected data marks and to determine a display of the cell on its said position. It is better to perform all the implementing procedure individually from detecting data marks to determining displays of cells by each color component. It is also possible to specify positions of cells by collecting information of calculated positions for each color component and to determine displays of cells for each color component on its positions. It is possible to use the same method for each color component as for the monochrome two-dimensional code for detecting an image pattern and determining a display on each cell.

Another aspect of the present invention relates to the reading method of a two-dimensional code as mentioned above, further characterized by the following: the above image pattern includes a pattern of a mark surrounded by a blank area, and the image pattern can be detected by distinguishing a contrast between a marked area and a blank area for each color component containing the image data.

The data mark that composes a colored display on each cell is expressed by a combination of color components contained in each pixel. For example, by using the color components of red, green and blue contained in each pixel, eight colors, black, cyan, magenta, yellow, red, green, blue and white, are expressed. In this case, a surrounding blank area is displayed in white or black. It is also possible to use pixel tones for each color component on a data mark, and in this case, colors are expressed by a combination of medium pixel tones.

When detecting an image pattern, the image can be determined by considering the contrast with the surrounding area as an indicator for each color component. If the blank area is white, the data mark may be detected as the marked area has a subtractive color mixture, in other words, has cyan, magenta, and yellow components. Contrarily, if the blank area is black, the data mark may be detected as the marked area has an additive color mixture, in other words, has red, green or blue components.

The reading method for a two-dimensional code according to another aspect of the present invention is a reading method for a two-dimensional code with digital information expressed by colored displays on a plurality of cells arrayed two-dimensionally and for colored image data containing said two-dimensional code constituted by each pixel retaining plural color components, comprising a feature of: analyzing image data in each color component containing the image data.

For a colored two-dimensional code, it is preferable to analyze each color component by using the same method as for a monochrome two-dimensional code. In other words, when detecting an image pattern of data marks, the image pattern can be detected for each color component by scanning the images corresponding to the number of decomposed color components. In this case, although the amount of scanning increases, the amount of the entire calculating time remains short, because it is possible to apply the same simple calculation as for a monochrome two-dimensional code for detecting a repeated image pattern. Furthermore, in order to determine displays of cells on said specified positions, the same simple method can be used for each color component as for the monochrome two-dimensional code. The entire calculating time also remains short. For analyzing this type of image, it is possible to perform predetermined conversion, such as reversing the pixel tone or transforming the colors.

The displaying method for a two-dimensional code according to another aspect of the present invention is a displaying method for a two-dimensional code with digital information expressed by colored displays on a plurality of cells arrayed two-dimensionally; the color display of the cell is constructed by an image pattern that can be distinguished from surrounding cells.

Generally, an output device has plural color components, the combination of which expresses colored images. As for an output device, a recording device such as a printing device, an ink jet printer or a xerographic printer is used. These devices usually output by overlaying cyan, magenta and yellow ink (or toner) and express colors with a subtractive color mixture. Color components other than the above three can also be used. As for an output device, a display device is also used. In this case, usually an additive color mixture is expressed by luminescent materials in red, green and blue.

There can be many types of a color display of a cell by various combinations of color components retained by the output device. If the output device is a recording device, for example, by outputting data marks in overlaid colors of cyan, magenta and yellow on a white piece of paper, eight types of cells in black, cyan, magenta, yellow, red, green, blue and white are expressed. If the output device is a display device, luminescent materials in red, green and blue are combined and express the above eight types of cells. The display of cells may be expressed using pixel tones, and thus even more types can be expressed.

Each color component of a data mark can be overlaid on a cell and then displayed. If data marks are not displayed without being overlaid, a problem may occur where a certain color component of the data marks gets mixed into the other color component of blank areas as image noise. In this case, it becomes difficult to ensure a sufficient contrast between a marked area and a blank area and the data marks may not be properly detected. Thus, it is preferable to match positions of each color component of data marks, overlay and display them.

Another aspect of the present invention relates to the displaying method of a two-dimensional code as mentioned above, further characterized by the following: the above image pattern includes a pattern of the mark surrounded by a blank area and is displayed with an enough contrast between a mark area and a blank area for the detection in each color component of an output device.

When outputting data marks from a recording device onto recording media such as a paper, color data marks displayed on cells can be outputted with combined color components of a subtractive color mixture, cyan, magenta and yellow, obtained from the ink or toner of the recording device. At this point, surrounding blank areas of the data marks do not have to be outputted, and therefore, their color remains white, the same as the background color of the paper. Accordingly, the marked areas can be displayed with high contrast to the blank areas. However, commonly used recording devices also have black ink or toner in addition to the color components of a subtractive color mixture printing, in this case, black component can also be outputted.

On the other hand, when using the display device, colored data marks on cells can be displayed with combined luminescent materials that have color components of an additive color mixture. The technology related to this invention does not depend on whether images are outputted on marked areas or on blank areas. If the images are outputted on marked areas, the blank areas may turn black because they do not have any signal, and if the images are outputted on blank areas, the blank areas may turn white because of their emission of light.

The displaying method for a two-dimensional code according to another aspect of the present invention is a displaying method for a two-dimensional code with digital information expressed by colored displays on a plurality of cells arrayed two-dimensionally comprising a feature of; outputting plural data rows obtained by the division of digital information in each color component of an output device.

The digital information displayed on a two-dimensional code is usually composed of a data row arranged in 1 and 0. This data row can be separated into plural data rows that correspond to each color component of an output device. The separated data row may correspond in number of each color component evenly. For example, for the cyan, magenta and yellow components of a recording device, the data row may be divided into repeated rows in the order of cyan, magenta and yellow. It is also possible to divide the entire data row by colors in blocks: dividing the first one third of the data row into cyan, the second one third into magenta, and the last one third into yellow.

The divided data rows may form image data in the same way as the row in a monochrome two-dimensional code. By this way, it is possible to form a colored display composed of a combination of plural color components with the same simple method as a monochrome display. The derived image data can be displayed with overlaid individual color components of the output device. When outputting the image, image data of each color component may be unified, form colored image data and then outputted. Furthermore, when outputting images, it is possible to perform prescribed transformation of pixel tone, such as an inversion or a transformation of colors for each image data.

The executing program according to another aspect of the present invention is an executing program comprising a feature of: the reading or displaying method for a two-dimensional code mentioned above is executed on a computer.

As for a computer used for executing the programs, it is possible to use various kinds of common computers such as a personal computer, a workstation or a main frame, as well as a computer with an electronic device such as a mobile phone or a PDA. Furthermore, it is possible to use a computer specially designed for executing this program.

By using method and executing program for reading and displaying a two-dimensional code in this invention, the result is not influenced by image distortion caused by various factors, and digital information can be displayed in high density and can later be reconstructed correctly.

By using this invention, it becomes possible to treat digital information more easily and more comfortably that respond to the recent technological progress.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BRIEF EXPLANATION OF SYMBOLS

Figure 1:
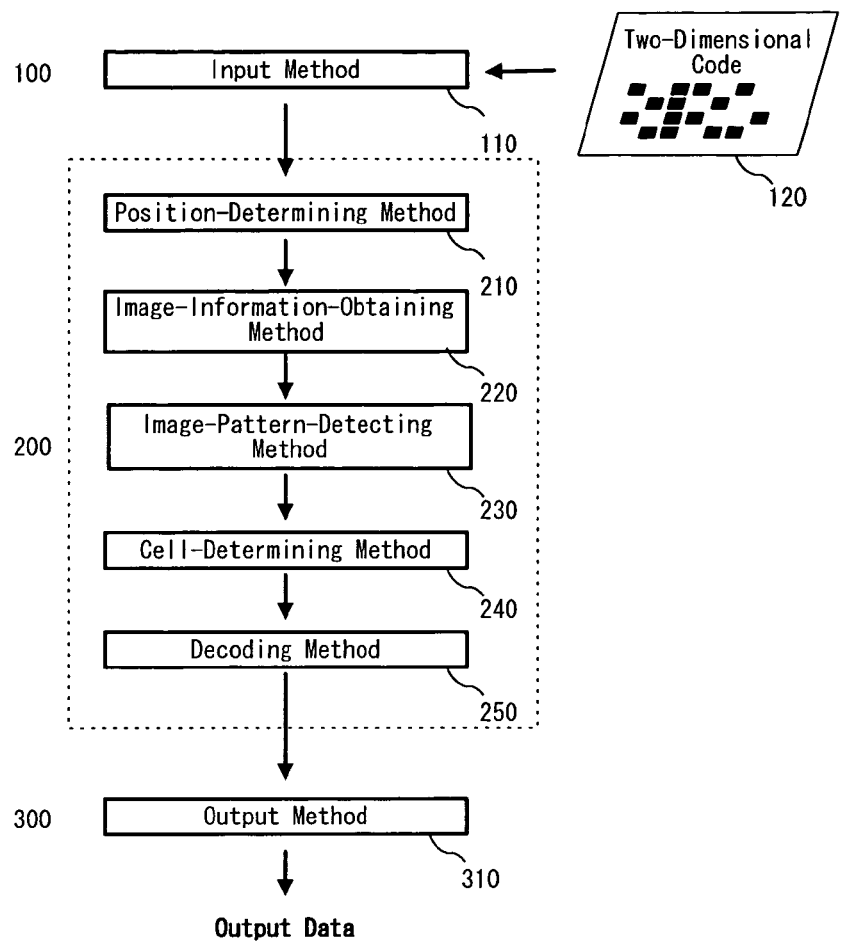
(FIG. 1) Illustration constructing the reading process of a two-dimensional code in implementation form 1

001, 061: marked cells
002, 063: blank cells
003, 005: marked areas on cells
004: blank areas on cells
006: a pixel element
007: pixel tone
010: positioning symbol
008, 011, 051, 052, 062 and 064: verification patterns
021, 022, 023, 031, 032 and 033: color data marks
041, 042: reference marks for calculating image information
071, 073, 081 and 083: plural marked cells arrayed successively
072, 074, 082 and 084: an image pattern including plural cells
100: input component of two-dimensional codes
110: input method
120: a two-dimensional code on recording media
200: interpreting component
210: position-determining method
220: image-information-obtaining method
230: image-pattern-detecting method
240: cell-determining method
250: decoding method
260: image-data-separating method
270: data-row-merging method
300: output component
310: output method
400: input component
410: input method
500: generating component
510: encoding method

520: image-data-generating method
530: data-row-separating method
540: image-data-merging method
600: output component
610: output method
J0: area determined as blank cells
J1: area determined as marked cells
C: data marks, with cyan-colored
M: data marks, magenta-colored
Y: data marks, yellow-colored
R: data marks, red-colored
G: data marks, green-colored
B: data marks, blue-colored
K: data marks, black-colored
C1: cyan separation (channel)
M1: magenta separation (channel)
Y1: yellow separation (channel)

DETAILED DESCRIPTION OF THE INVENTION (Implementation Form 1)

Explanation in implementation form 1 of this invention, the structure of processing systems for reading a two-dimensional code in this implementation form 1 is shown as FIG. 1. The method for reading a two-dimensional code in this implementation form 1 are composed of an input component 100, an interpreting component 200, and an output component 300.

An input component 100 optically obtains the image of a two-dimensional code printed on recording media and transfers image data to a computer. Known devices are used for obtaining image data, actually a digital camera with 500 thousand pixels in a cellar phone and a flatbed type of scanner with the resolution of 600 dots per inch are used for this implementation.

An interpreting component 200 interprets image data into digital information by calculating the regularity of the digital image on a computer. Digital information displayed in a two-dimensional code can contain various kinds of information as follows: the individual information such as a name, an address, a telephone number, the advertisement information such as a merchandise name and the website address, and the contract information such as a merchandise name and its price the company's name and whatever.

An output device 300 output digital information obtained by interpretation of image data. Known devices are used for outputting digital information, which includes printing on a recording media, expressing on a display device and preserving digital data in database in a computer.

The following part describes the structure of interpreting component 200. The component 200 is composed of position-determining method 210, image-information-obtaining method 220, image-pattern-detecting method 230, cell-determining method 240 and decoding method 250 as shown in FIG. 1. Each method from 210 to 250 contained in component 200 is actually processed by performing each executing program in a computer.

Position-determining method 210 detects images of positioning symbols displayed in specific position and identify the position of a two-dimensional code with related to the prescribed positioning symbols.

Image-information-obtaining method 220 obtains image information used for the detection of the repeated image pattern, and the determination the display of cells. In this implementation form, the average values of the pixel tones are calculated in each image area trimmed from the position-determining symbols, the image areas including a marked area and a surrounding blank area are used to calculate image information.

Image-pattern-detecting method 230 detects an image pattern of the data marks displayed on cells, which performs detecting by scanning image data with verifying an image pattern of the data marks.

Cell-determining method 240 calculates the position of the cells based on the positions of a plurality of detected image pattern and determines the display of the cells on its decided position.

Decoding method 250 reconstructs binary data row composed of 1 and 0 from the interpreted display of cells according to the prescribed rules.

About the processing procedures of both method 230 and method 240, see below for further details.

Figure 2:
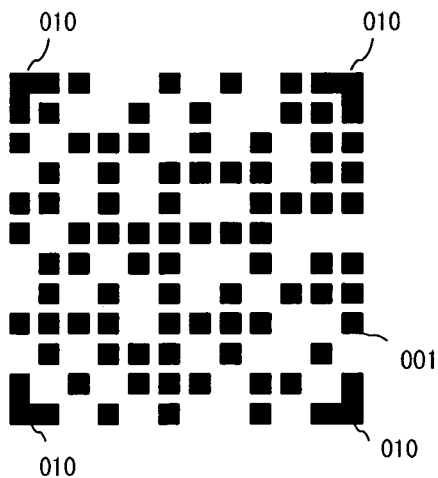
(FIG. 2) Illustration indicating a two-dimensional code in implementation form 1
Figure 3:
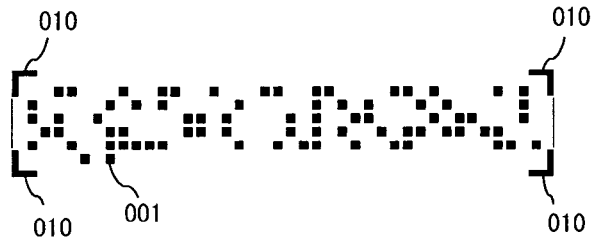
(FIG. 3) Illustration indicating a two-dimensional code arrayed in a rectangle shape (FIG. 4) Illustration indicating a part of two-dimensional codes in implementation form 1
Figure 6:
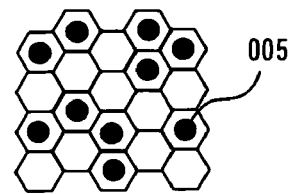
(FIG. 6) Illustration indicating a two-dimensional code composed of hexagonal cells (FIG. 7) Illustration constructing the creating process of a two-dimensional code in implementation form 1

FIG. 2 illustrates the entire structure of a two-dimensional code in this implementation form 1. The cells are arranged with style of matrix on recording media by 12×12 cells in this implementation. But, the technology related to this invention is independent with the number of arranged cells and the shape of arranged cells, which means it is possible to select a rectangle as a shape of cells as shown in FIG. 3 or a hexagon as a shape of cells as shown in FIG. 6. And the invention is independent with the shape of the data mark, so it is possible to display rounded data mark as shown in FIG. 6.

Figure 4:
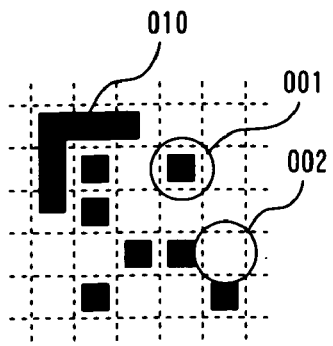
Figure 5:
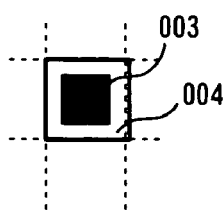
(FIG. 5) Illustration indicating a marked cell in implementation form 1

An enlargement of a two-dimensional code in this implementation form is shown in FIG. 4. In this case, the displays of cells is composed of marked cells 001 including a data mark on each cell and blank cells 002 without including any data marks. As shown in FIG. 5, the marked cell is composed of an area printed data mark 003 (marked area) and another area non-printed data mark (blank area) on the cell. A data mark displayed on each cell is separated from the surrounding data marks by making blank area between data marks.

The positioning symbol 010 is composed of the patterns easily classified from the other data marks and is displayed on the decided position in advance as the position of the two-dimensional code. Then, it is desirable to use a plurality of positioning symbols in order to keep accuracy for detecting images with distortion. In this implementation as shown in FIG. 2, positioning symbols are located in 4 corners of cell area. These positioning symbols may be located either inside arranged cells or outside arranged cells.

Figure 7:
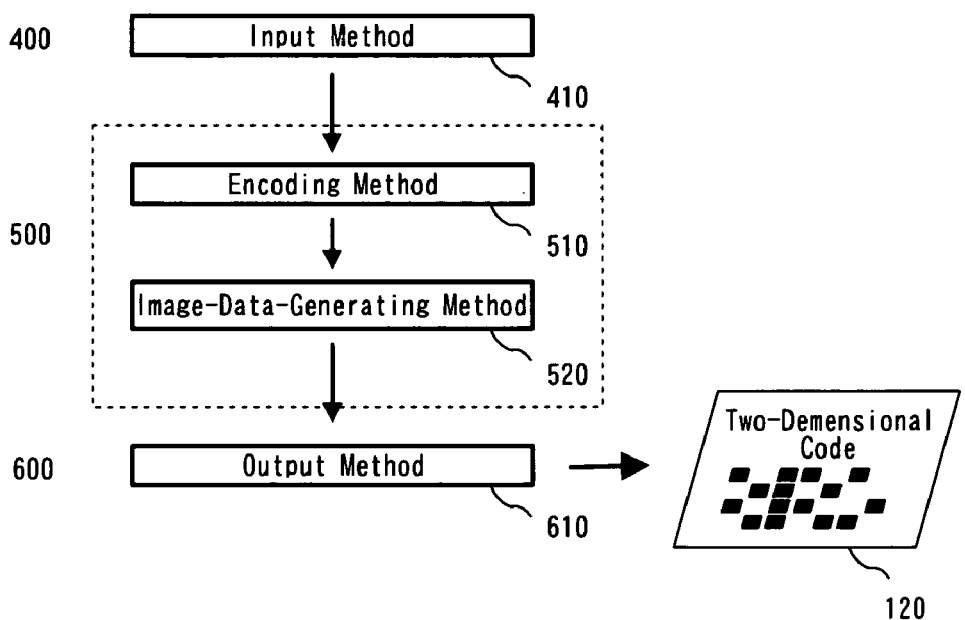

A summary composition figure of two-dimensional code on this implementation form is shown in FIG. 7. On this implementation form, the method for displaying a two-dimensional code is composed of input component 400, image-generating component 500, and output component 600. An input component 400 obtains the binary data rows composed of 0 and 1, which contains digital information, and transfers them to a computer. An image-generating component 500 generates the image data of a two-dimensional code from the inputted data. An output component 600 displays the image of a two-dimensional code within image data on recording media and display devices. The following description describes the method for encoding (510) and the method for generating image data (520) in an image-generating component 500.

The method for encoding (510) decides each display of cells on a two-dimensional code from data row obtained from input component. For this data row, each digit of digital data are assigned for cells arranged two-dimensionally, for example, 1 corresponds to a marked cell and 0 corresponds to a blank cell.

Figure 8:
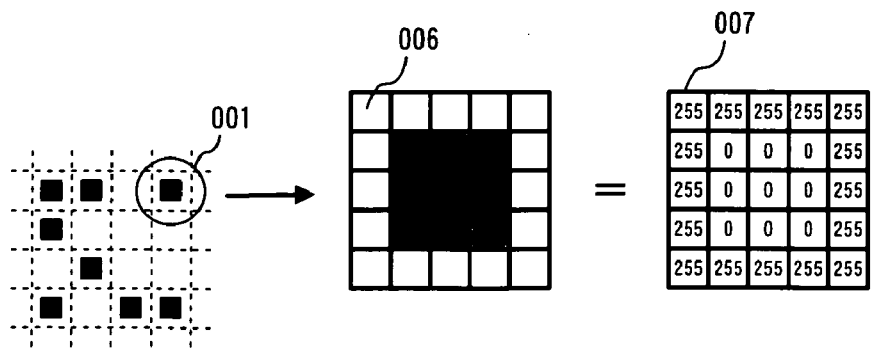
(FIG. 8) Illustration indicating image data in each pixel element when creating a two-dimensional code (FIG. 9) Illustration indicating image data in each pixel element when reading a two-dimensional code (FIG. 10) Illustration detecting an image pattern from image data (FIG. 11) Flow chart when detecting a repeated image pattern (FIG. 12) Illustration of reference marks displayed on cells (FIG. 13) Illustration indicating a verification pattern of a positioning symbol (FIG. 14) Flow chart of the determining process for corresponding cells in implementation form 1

In the method for generating image data (520) generates image data to output the display of the cells decided by the method for encoding (510) on display devices or on recording devices. The cell in image data is composed of a plurality of pixels. The cell on this implementation form and an image of the data mark displayed on the cell is shown in FIG. 8. In this implementation form, image data is expressed with 256 tones for each pixel. In this case, a value of pixel tone corresponds to lightness, which means 0 is considered as black, and 255 is considered as white.

An output component 600 outputs the images as the above using known recording devices. In this implementation form, an ink-jet printer (600 dpi mode) is used as a recording device. And a liquid crystal display (160 dpi) is used as a display device. In this way, the marked area is displayed as black color and surrounding blank area is displayed as white color on the display device. Printing technologies such as offset printing and Xerographic printers may be used as recording devices.

In this case, the marked area may be displayed as colors except for black color. By inverting relation between the marked area and the blank area, the marked area may be displayed as white and the blank area may be displayed as black. Moreover, the marked area may be displayed as various kinds of tones for the cells by varying pixel tones.

When displaying marked areas with pixel tones, it is possible to use medium tones, for example 66% and 33% in gray level, in addition to data mark (100% in gray level) and no data mark (0% in gray level). In the case of this display, a cell can have 4 digits on each data row, which contains "00" as 0%, "01" as 33%, "10" as 66% and "11" as 100% in an example of data mark's output.

In this case, each pixel tone is expressed by known methods which depend on each technology of recording devices and display devices. In the case of recording devices, each pixel tone is expressed by varying the area coverage of plural inks or toners adhered on recording media. In the case of display devices, each pixel tone is expressed by varying the illuminant ratio of plural lighting materials on display devices.

In the method for reading a two-dimensional code in this implementation, image data contained an image of a two-dimensional code is obtained in an input component 100. The following expression describes the specification of these image data in detail. Each pixel has pixel tone for darkness in image data. In this implementation form, image data is composed of 256 tones, which means each pixel has the tone corresponded to the darkness from 0 to 255, white pixel corresponds to 255 and black pixel corresponds to 0. In this invention, the number of pixel tones is not limited as 256 tones, and other number such as 512 tones or 1024 tones may be selected.

Figure 9:
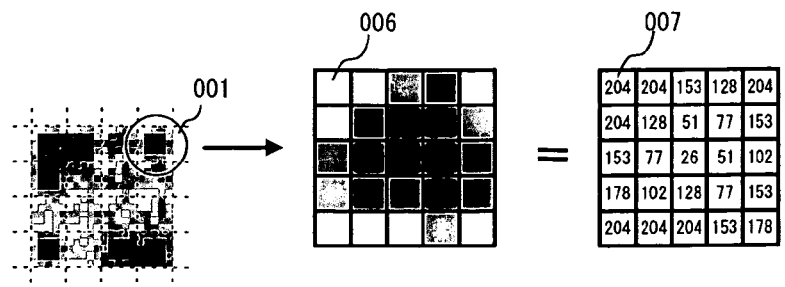

FIG. 9 shows the image of a marked cell, which corresponds to a part of the image data in this invention. Thus, the image data treated in this invention varies by affecting factors such as noise when inputting or outputting. As a result of these variations, ideal black (0) or ideal white (255) does not exist in a pixel tone. For example, marked areas can be inputted as a gray level about 80 in 256 levels and blank areas can be inputted as a gray level about 200 in 256 levels.

In case of analysis for image data, it is possible to inverse the pixel tone in image data in advance, whose processing causes the value close to 0 as white and the value close to 255 as black. In this case, it is possible to normalize the value of a pixel tone in image data, and pixel tones vary between 0 and 1 after normalizing. In this implementation form, a pixel tone (d') is inversed and normalized as the pixel tone (d). In this case, pixel tone (d) is calculated by equation d=(255-0/255, which varies between 0 (white) and 1.0 (black).

In the method of reading for a two-dimensional code in this implementation form; the image pattern of data marks displayed on cells is detected by means of detection 230 for this image data. The following describes the means of detection 230 in detail.

Figure 10:
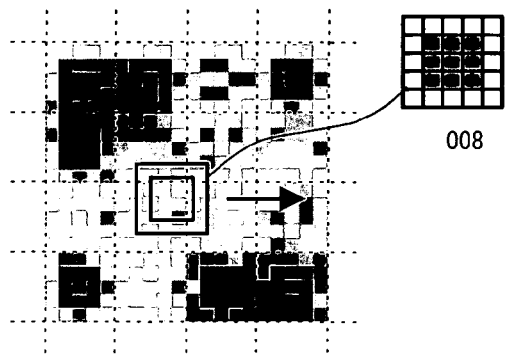
Figure 11:
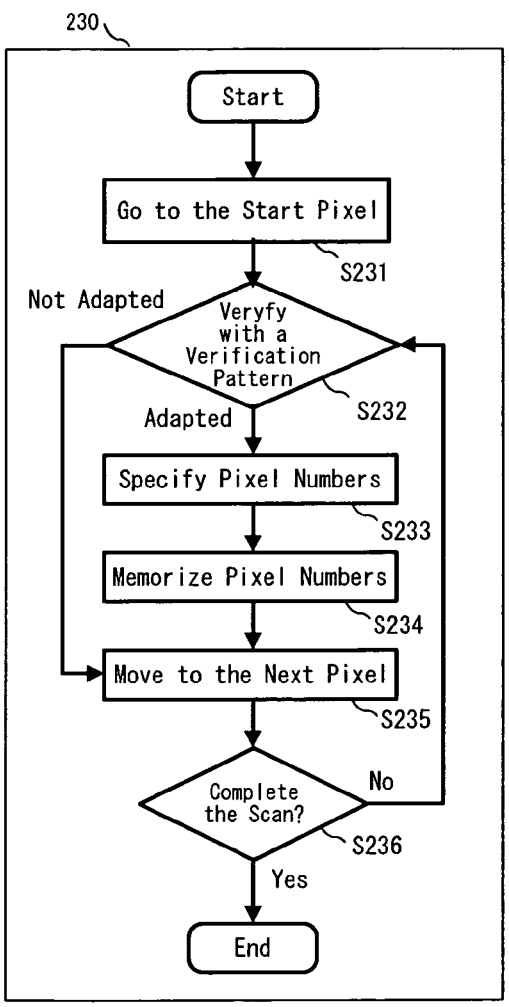

Means of detection 230 scans the image data, verifying images with a verification pattern 008 composed of a marked area and a blank area surrounding the marked area (FIG. 10). After verifying images, a part of image data is detected as a data mark when the image adapting to a reference image. The process is performed by the procedure as shown in the flow chart of FIG. 11.

Figure 12:
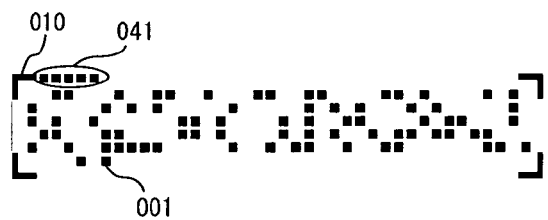

The reference mark is supposed as the image which is composed of a marked area of 3×3 pixels on a cell of 5×5 pixels. Each average value (Dm and Dv) of pixel tones on a marked area and a blank area in image pattern is used to detect the image verified with verification patterns. Accordingly, when satisfying the condition of an equation, which includes 2 average values as the above in Dm and Dv, the detected image is considered as the corresponding data mark. In this implementation form, the equation (1) is used for detection.

$$\frac{D_v - M_v}{R_v S_v} - \frac{D_m - M_m}{R_m S_m} < 1 \qquad (1)$$

Where Rm and Rv in equation (1) are constant values decided in advance, in this implementation form Rm=Rv=5 is used. Four parameters, Mm, Sm, Mv, Sv, are image information to verify images, and they are decided from images on image data by image-information-obtaining method. In this implementation form, image information to use for the verification is calculated from images of positioning symbols. As other ways, image information can be calculated from the images displayed in the prescribed cells, which contains the reference mark of the same pattern as other data marks (in FIG. 12). After detecting data marks with slight derangement in cell area, image information can be calculated from images of the data marks. In this case, the other data mark, which is not detected still, is detected by the gained image information.

As the image information, the average value (Mm) and standard deviation (Sm) of pixel tones are calculated in a marked area, and the average value (Mv) and standard deviation (Sv) of pixel tones are calculated in in a surrounding blank area. The average values and standard deviation values of pixel tones in each area are calculated using known equations (2) and (3). Where n, i, di, and E correspond to the number of pixels, a number of each pixel, pixel tone of pixel i, and the sum of pixels in each area.

$$M = \frac{\sum d_i}{n} \qquad (2)$$

$$S = \sqrt{\frac{\sum (d_i - M)^2}{n-1}} \qquad (3)$$

According to the above method, it is possible to detect an image pattern of plural data marks by scanning images with repeating both verification and determination of images. The cell displaying the detected data mark is identified from the relation to the position of positioning symbol. As a result, when data mark is detected, the display of corresponding cell becomes clear as a marked cell. By repeating detection for all data marks as the above, cells are considered as blank cells when data mark is not detected. In this case, the displays of all cells become clear by using image-pattern-detection method 230, and cell-determination method 240 does not need to process. In the other case, image-pattern-detection method 230 can detect only a set of images with slight derangement. In this case, the display of cells is determined in the corresponding position by calculating positions of the cells from the positions of detected image patterns in cell-determination method 240.

Figure 13:
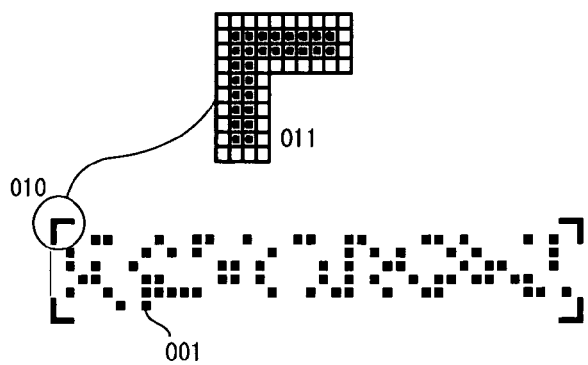

Positioning symbol is detected by processing the same process as the detection of data mark. By scanning image data with verifying a verification pattern and determining images in the verification, an image of a positioning symbol is detected. In this case, the calculated value in the left side of equation (1) is used for the indicator of adaptation. The smaller the calculated value in the left side of equation (1) becomes, the higher adaptation the condition is considered as. FIG. 13 shows the verification pattern of positioning symbol 011. The above detection of images is performed by substituting Dm and Dv gained from comparison with the patterns 011 in equation (1). Ideal values (Mm=1, Sm=1, Mv=0, Sv=1, Rm=1, Rv=1) are used in equation (1).

In this implementation form, positioning symbols are located in the four corners of cell area (as shown in FIG. 2). Each of four types of positioning symbol patterns exist only once in the image data. So the images satisfying the condition of equation (1), taking the minimum value in the left side of equation (1), are selected as the images of positioning symbol. In the method as above, each of four types of positioning symbols are selected from image data separately.

The method of reading a two-dimensional code in this implementation determines the display of cells by using cell-determination method 240, after detecting a repeated image pattern using image-pattern-detection method 230. The following describes cell-determination method 240 in detail.

Figure 14:
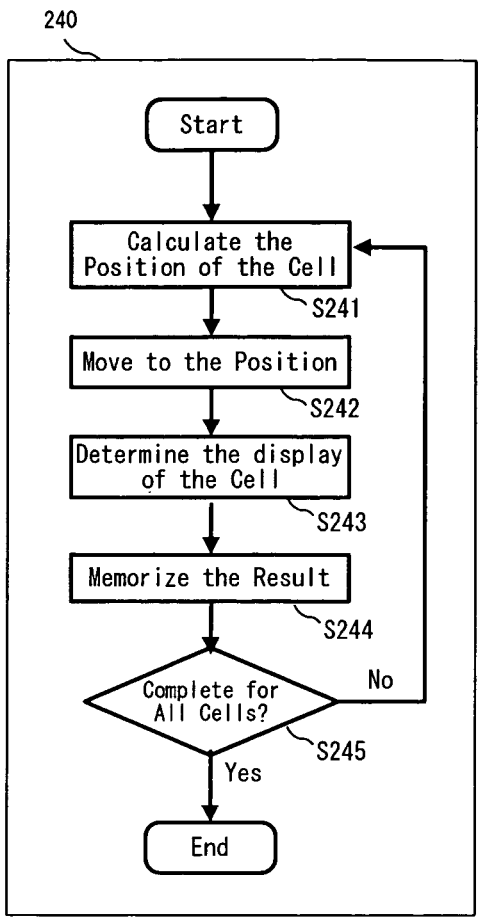

Cell-determination method 240 calculates the position of cells based on the position of plural data marks detected. In addition, the display of cells is determined on the corresponding position. By repeating these processes, the display of all cells is determined. A series of processes is performed according to flow chart shown in FIG. 14 in this implementation form.

Figure 15:
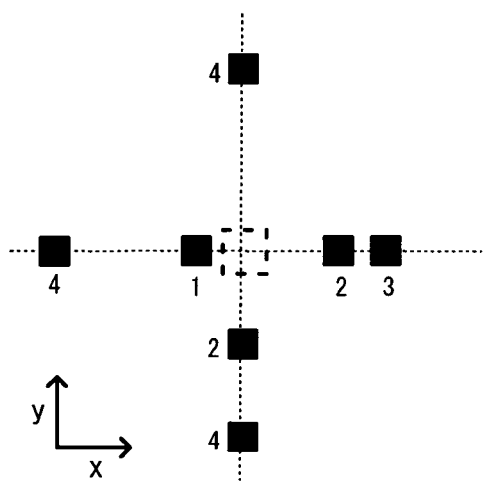
(FIG. 15) Illustration calculating the position of cells from the cross point of regression lines (FIG. 16) Illustration indicating the area determined by the equation (1) for determination (FIG. 17) Illustration indicating the area determined by the equation (6) for determination (FIG. 18) Illustration of an image pattern constructed by three layers (FIG. 19) Illustration of a color two-dimensional code in implementation form 2

Calculating regression lines from plural data marks detected and the cross point of these lines is adopted as the method for calculating the position of cells (as shown in FIG. 15). In this implementation form, regression lines are calculated as linear lines for positions of plural data marks arrayed in each axis of column and row because cells are arrayed in lattices of a square shape. For the calculation method of regression, it is selected to use the method of the least square weighted with the distance from the cell in equation (4). Where i corresponds to the number of cells, corresponds to the sum of the number of pixels in axial direction, (X, Y) corresponds to the coordinate located on images and wi corresponds to the coefficient of weight in equation (5). In equation (5), n corresponds to the distance from cells, the closer data mark is located to the calculating cell, the larger the coefficient of weight wi becomes. The calculated values (X, Y) are rounded off to decimal places.

$$Y = aX + b \quad (4)$$

$$a = \frac{\sum w_i^2 \sum w_i^2 x_i y_i - \sum w_i^2 x_i \sum w_i^2 y_i}{\sum w_i^2 \sum w_i^2 x_i^2 - (\sum w_i^2 x_i)^2}$$

$$b = \frac{\sum w_i^2 x_i^2 \sum w_i^2 y_i - \sum w_i^2 x_i y_i - \sum w_i^2 x_i y_i \sum w_i^2 x_i}{\sum w_i^2 \sum w_i^2 x_i^2 - (\sum w_i^2 x_i)^2}$$

$$w_i = \frac{1}{n} \quad (n = 1, 2, \ldots) \quad (5)$$

It is adopted for determining the display of cells to compare pixel tones at the center of cells with the threshold value. In the case of outputting images in marked area, when the pixel tone at the center of the cell is darker than the threshold value, the corresponding cell is determined as a marked cell. On the contrary, when being lighter than the threshold value, the corresponding cell is determined as a blank cell. In this implementation form, the threshold value is decided by calculating image information from the images of marked cells detected in advance. For all of marked cells detected, each average value of pixel tones in both marked area (Mm) and blank area (Mv) is calculated, and medium value of them (=(Mm+Mv)/2) is decided as threshold value. In other case, threshold value can be decided from the image of reference marks displayed in prescribed cells or the image of positioning symbols.

On the other hand, as a method to determine the display of cells, it is possible to verify images using same pattern with the verification pattern in image-pattern-detection method 230. When satisfying the condition in equation (1), detected images can be determined as marked cells, and when dissatisfying the condition, detected images can be determined as blank cells. For determining images, it is preferable to select bigger value than the condition of image-pattern-detection method 230 in Rm and Rv of equation (1), for example Rm=Rv=12. In this case, Mm, Sm, Mv and Sv may be decided from the images of marked cells detected in advance as the above.

Figure 16:
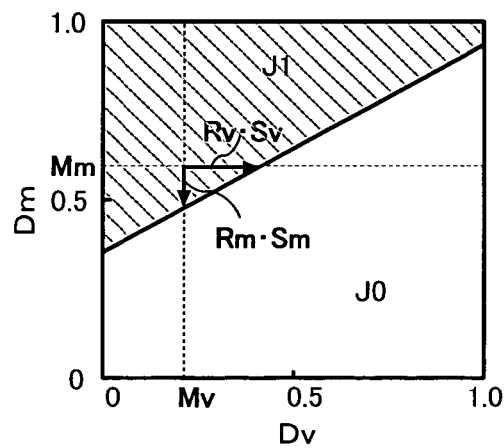

The following describes the meaning of equation (1) for detecting images used in the reading method of a two-dimensional code in this implementation. The condition expressed in equation (1) determines the adaptation for images using average value and standard deviation of pixel tones in each area of an image pattern calculated in advance. Pixel tone (D) in each area of an image pattern is considered to be equivalent to the average value (M) of image information. When pixel tones are fluctuated according to normalized deviation, the deviation of pixel tones is expressed as R*S using standard deviation (S) of pixel tones, where R is constant to decide the extent of tolerance. When satisfying the condition of −1<(D−M)/(R*S)<1, pixel tone (D) of each area can be considered as the image of the marked cell. Equation (1) is expressed by combining the extent of tolerances for each area. FIG. 16 shows the extent of adaptation in equation (1) as an abstract figure. In FIG. 16, when values in each area (Dm and Dv) exist within the extent of J1, the corresponding area is detected as the marked cells, when these values existing within the extent of J0, the corresponding area is detected as the blank cell.

In this implementation form, the value of the left side in equation (1) is also used for the indicator of adaptation of an image pattern. Larger the pixel tone of marked area (Dm) becomes and smaller the pixel tone of blank area (Dv) becomes in the image pattern verified, Smaller the indicator (the value of the left side in equation (1)) becomes. Accordingly, if the left side of equation (1) becomes smaller, the adaptation of the corresponding image is considered higher as the prescribed image pattern. When detecting a marked cell, equation (1) may be satisfied for the same marked cell as repetitions, such as one-pixel disarranged images with overlaid, by the fluctuation of the pixel tone in each pixel. In order to prevent the repetition of detection for the same marked cell, after investigating the adaptation for plural surrounding positions, the image which has the highest adaptation in these positions is selected as the prescribed marked cell.

Figure 17:
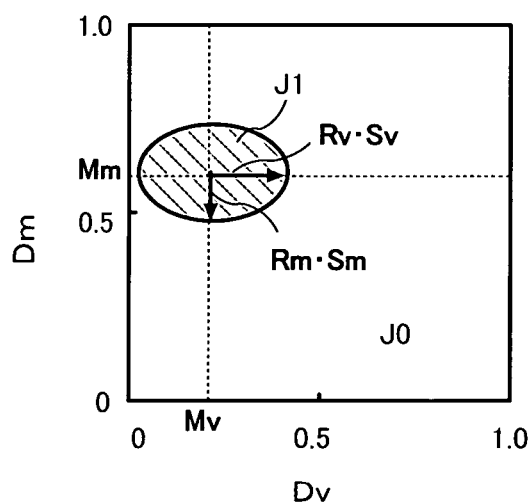

In stead of equation (1), equation (6) can be used for detection. The condition in equation (6) is considered as the prescribed image pattern when satisfying the condition in equation (6) substituted pixel tone of each area in the same as equation (1). FIG. 17 shows the extent of adaptation in equation (6) as an abstract figure.

$$\left(\frac{D_v - M_v}{R_v S_v}\right)^2 + \left(\frac{D_m - M_m}{R_m S_m}\right)^2 < 1 \quad (6)$$

Figure 18:
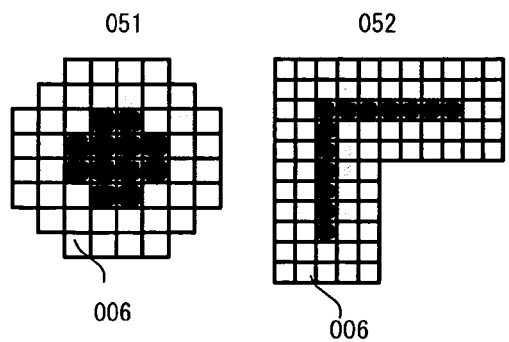

The image pattern can be composed of more than three areas when detecting images. For example, FIG. 18 shows a verification pattern 051 which contains three layers for data marks of rounded shapes. The detection of images is performed by substituting pixel tones in each area to the equation for determination in the same case as the image pattern that has 2 areas. As the equation for determination, it is preferable to use equation (7) generalized from equation (6). In equation (7), N corresponds to the number of areas composing image pattern and i corresponds to the number of each area. Then, the values of image information substituting to the equation can be obtained from the images of positioning symbols. FIG. 18 shows the verification pattern 052 to obtain the image information.

$$\sum_{i=1}^{N} \left(\frac{D_i - M_i}{R_i S_i}\right)^2 < 1 \quad (7)$$

(Implementation Form 2)

The following sentences describe implementation form 2. This implementation form is related to color two-dimensional codes displaying cells with color. Two-dimensional codes are printed on recording media such as papers or sheets using color recording devices, and displayed using color display devices. In this implementation form, an ink-jet printer 600 dpi with resolution, and liquid crystal display 160 dpi with resolution and 32 bits color with depth are used.

Figure 19:
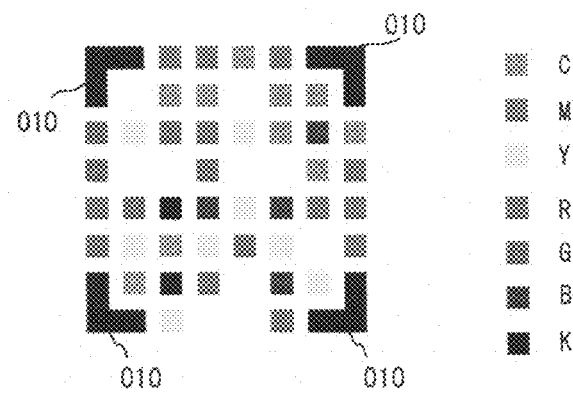
Figure 20:
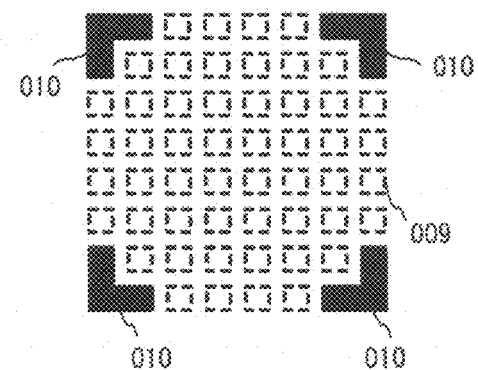
(FIG. 20) Illustration indicating a form of a color two-dimensional code (FIG. 21) Illustration of higher resolution image of a color two-dimensional code in implementation form 2
Figure 21:
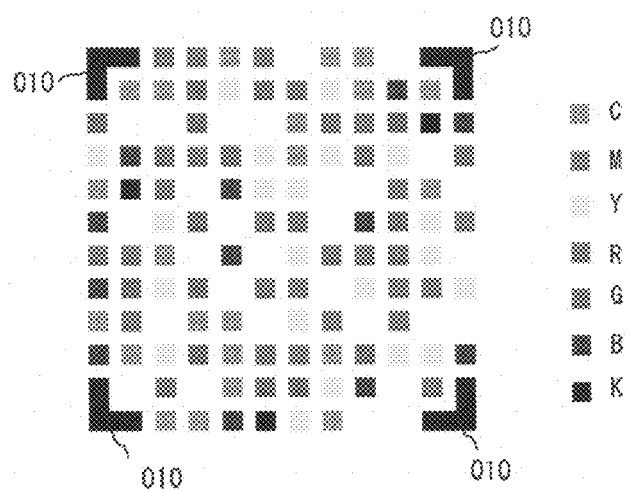

FIG. 19 shows color two-dimensional codes in this implementation form. FIG. 19 illustrates color data marks composed of digital information, which corresponds to the positions displaying data mark as shown in FIG. 20. The cells are arrayed in lattices of a square shape composed of 8 by 8 cells in this implementation form. The array of cells is not limited with 8 by 8 cells, which can adopt 12 by 12 cells as shown in FIG. 21. The technology related to this invention is independent with the number of cells.

Positioning symbols are displayed with wider contrast than prescribed value between marked area and blank area for all colors that recording devices have. In this implementation form, positioning symbols are printed as black and blank area is expressed as white. When printing data marks in recording devices, black area may be printed with overlaid cyan, magenta and yellow or with black. In this implementation form, black area is printed with only black using black ink.

Figure 22:
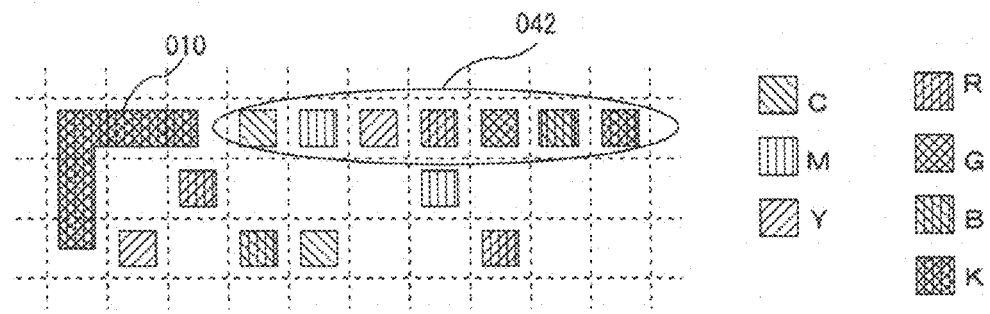
(FIG. 22) Illustration of color reference marks displayed on cells (FIG. 23) Flow chart indicating the reading process of a color two-dimensional code (FIG. 24) Illustration indicating the reading process of a color two-dimensional code (FIG. 25) Flow chart indicating the creating process of a color two-dimensional code (FIG. 26) Illustration indicating the creating process of a color two-dimensional code (FIG. 27) Illustration indicating overall of a two-dimensional code in implementation form 3

In order to obtain image information for determining the display of cells, it is preferable to display reference marks composed of the same pattern as data marks on the prescribed cells. In this implementation form, FIG. 22 shows 7 kinds of references marks which contain black, cyan, magenta, yellow, red, green and blue except for white. Image information for white is obtained from blank area in the image data.

Figure 23:
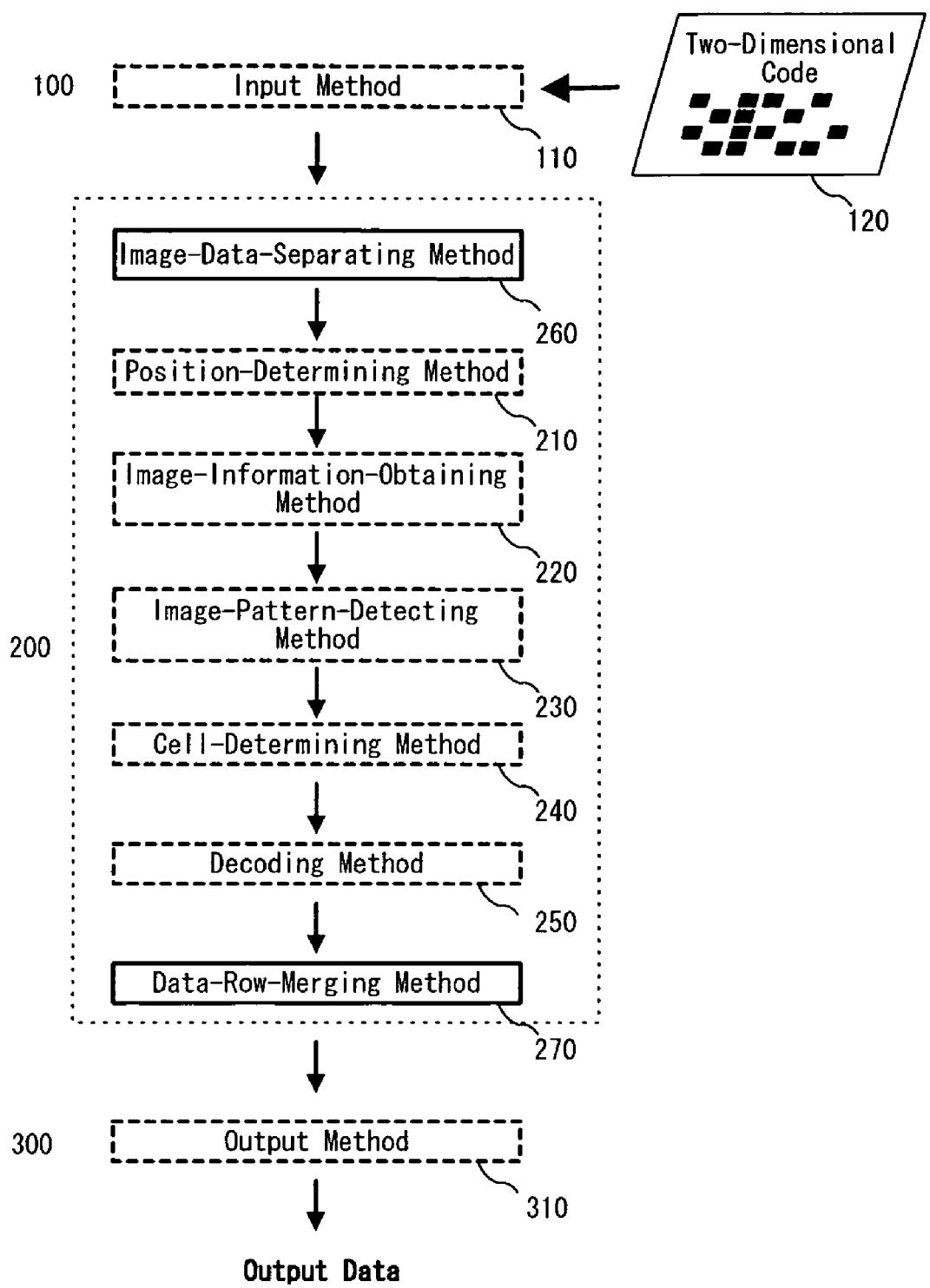

FIG. 23 shows abstract figure composing the reading method of two-dimensional codes in this implementation form. The reading method of two-dimensional codes in this implementation form, the same as implementation form 1, is composed of input component 100, interpretation component 200 and output component 300. Input component 100 and output component 300 are similar to those in implementation form 1 except for treating color images.

Interpretation component 200 analyzes color images obtained in input component 100 and acquires digital information expressed in the two-dimensional code. Interpretation component 200 contains, in addition to the contents in implementation form 1, image-data-separating method 260 as preparation of position-determining method 210 and data-row-merging method 270 as post-process of decoding method 250.

Because image data obtained in input component 100 is composed of the color separation of addition, pixel tone in each pixel is expressed as (Red signal, Green signal, Blue signal). When expressing pixel tone with 256 tones, black is expressed as (0, 0, 0), red is expressed as (255, 0, 0), cyan equivalent to complementary color of red is expressed as (0, 255, 255) and white is expressed as (255, 255, 255). Color image data can be expressed as color separation of subtraction, cyan, magenta and yellow. Although pixel tone in each pixel is expressed with 0 or 255 as ideal signal, actual image data contains the fluctuation and blurriness by each device.

Image-data-separating method 260 separates image data into each color separation. When separating image data into each separation, each separation is composed of images with 256 tones, which is equivalent to gray image. After separating images into each separation, each image is analyzed using the same method as monochrome two-dimensional codes described in implementation form 1. In the technology related to this invention, the separating image data described as general idea, analysis of color image data may be performed after separating images actually into 3 channels, or performed to the color image data for each color component separately.

Figure 24:
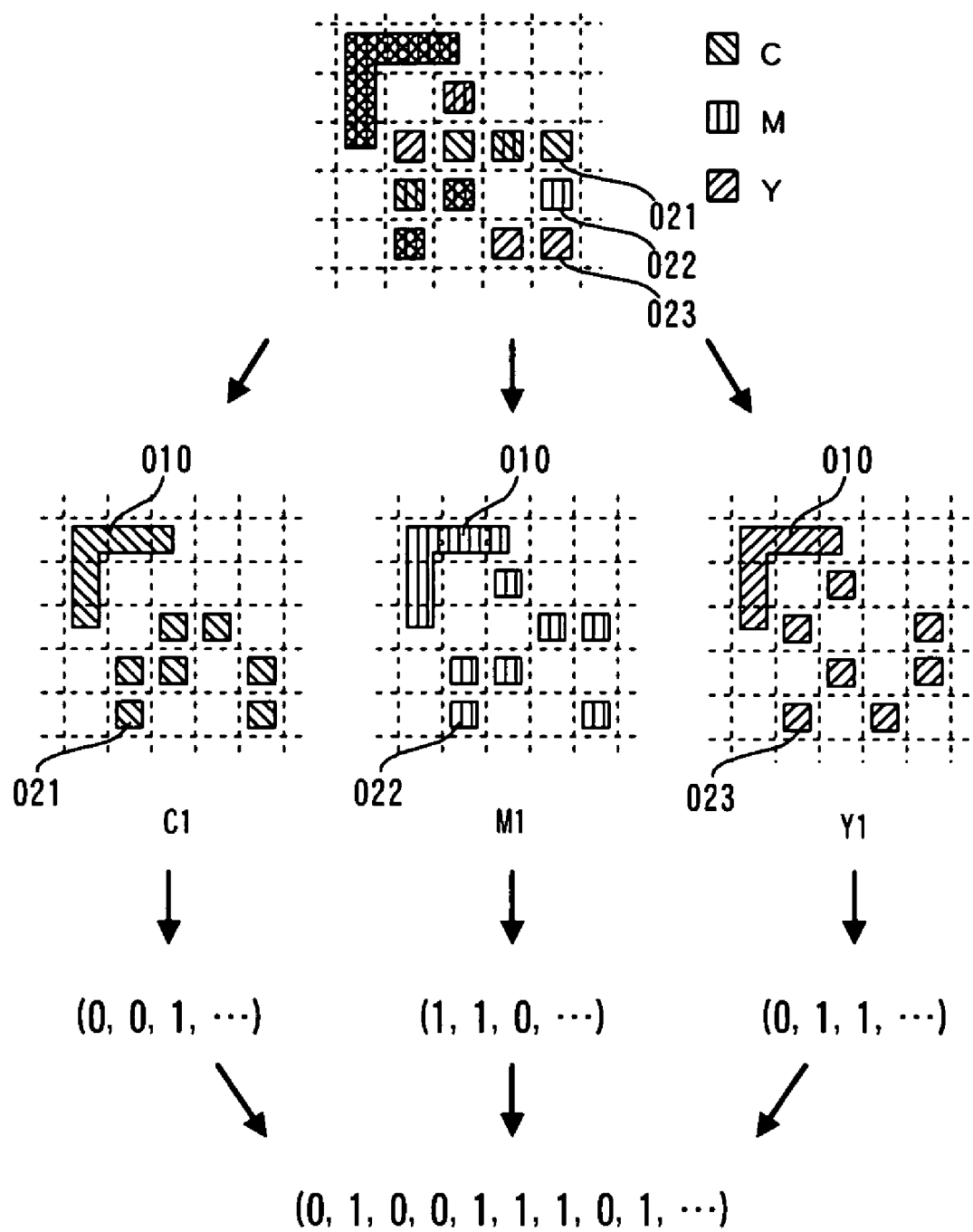

Data-row-merging method 270 unifies plural data rows obtained from analysis of images in each separation, which contains from position-determining method 210 to decoding method 250. The method for unifying data rows is performed using the same rules as the separation of data row when the color two-dimensional code is displayed, which is performed in the order of inverse of separation. By this procedure, the digital information expressed in a color two-dimensional code is interpreted. FIG. 24 shows the abstract figure about the method for reading a color two-dimensional code in this implementation form.

Figure 25:
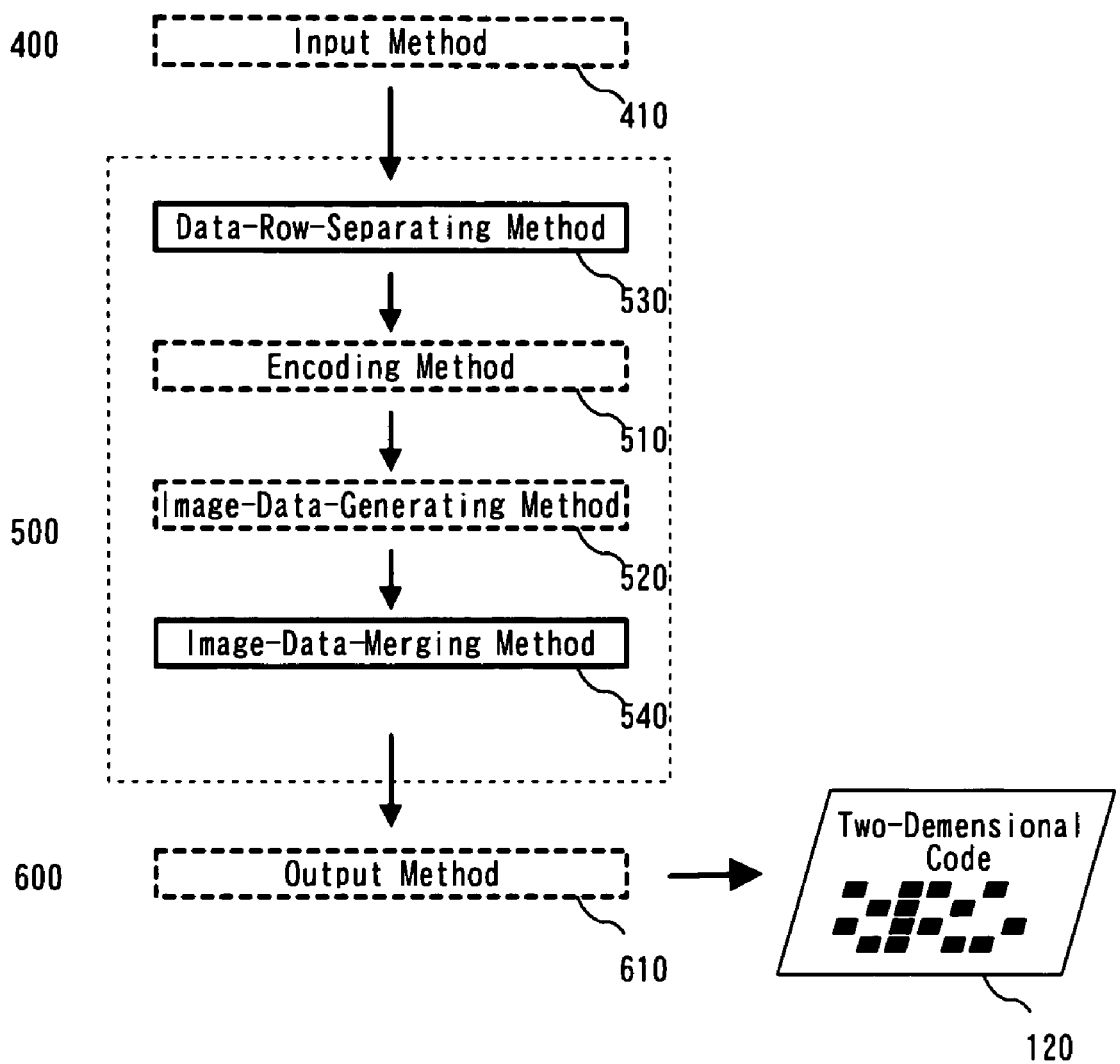

FIG. 25 shows the abstract figure composing the displaying method of two-dimensional codes in this implementation form. The displaying method for a two-dimensional code in this implementation form is composed of input component 400, generating component 500 and output component 600, the same form as implementation form 1. Input component 400 and output component 600 are similar to those in implementation form 1 except for treating color images.

Generating component 500 generates an image data of a two-dimensional code from binary data rows obtained in input component 400. Generating component 500 contains, in addition to the contents in implementation form 1, data-row-separating method 530 as preparation of encoding method 510 and image-data-merging method 540 as post-process of image-data-generating method 520.

Data-row-separating method 530 separates binary data row obtained from input component 400 into each separation. After the separation, image data is generated from the collection of data row separated into each separation by using the same method as monochrome two-dimensional codes in implementation form 1.

Figure 26:
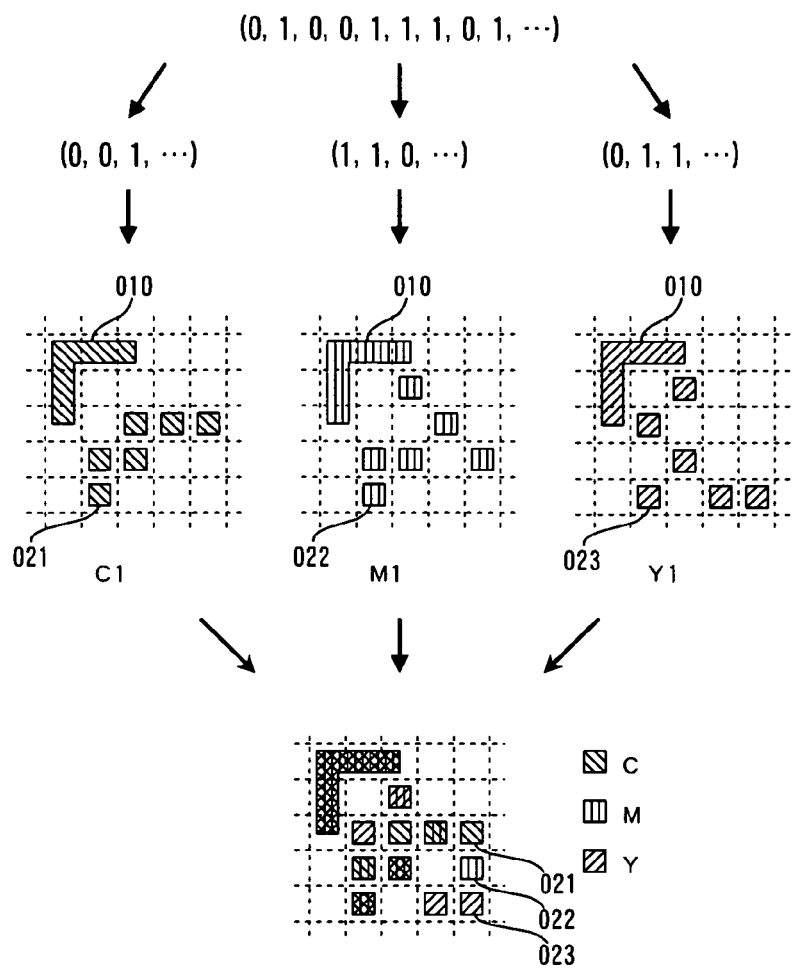

Image-data-merging method 540 unifies plural images obtained by generating image data in each separation, from encoding method 510 to image-data-generating method 520, into color image data. This method generates a color two-dimensional code from binary data row composing digital information. FIG. 26 shows abstract figure about the method for generating a color two-dimensional code in this implementation form.

In generating component 500, the display of cells may be determined based on the conversion of data rows, which converts binary data row into the corresponding data rows according to the type of cell display. When cells expressing 8 types of color display (black, cyan, magenta, yellow, red, green, blue and white), binary data row should be converted into the data of octal number. For the data of octal number, there is an example each number is expressed according to the relation between number and color: 8=black, 7=cyan, 6=magenta, . . . , 0=white. Thus, data row in each digit is expressed by using color display of each cell.

Other explanations in this implementation are abbreviated because they are similar to implementation form 1.

(Implementation Form 3)

Figure 27:
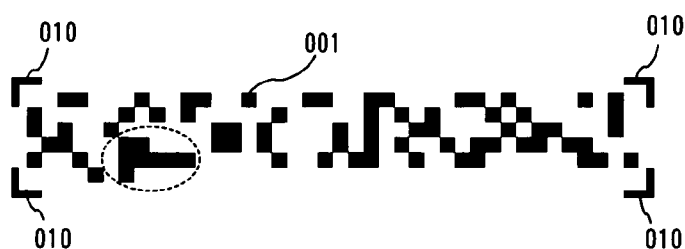

The following sentences describe implementation form 3 in this invention. Two-dimensional codes in this implementation form are expressed by the display of cells whether the data mark exists or not, and the cell is equipped without blank area in surrounding data mark. So the marked cell is expressed by overlaying with the data mark for the whole area as shown in FIG. 27. In a two-dimensional code as FIG. 27, neighboring data marks are expressed in the connected condition. In this case, it is impossible to detect each data mark separately because no border exists between data marks.

Two-dimensional codes are composed of many cells, and information is expressed by combining various kinds of marked cells. In these marked cells, there are the combinations of arrangement composed of blank cells in the surrounding area. In this case, it is possible to detect data mark(s) separating with neighboring data marks because the data mark(s) are surrounded by blank area.

Figure 28:
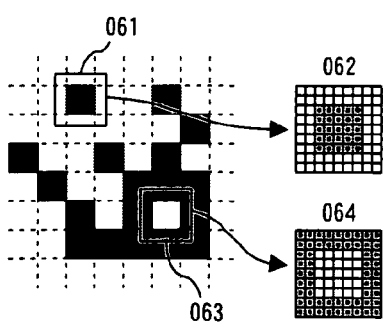
(FIG. 28) Illustration of verification pattern example 1 in implementation form 3

The reading method of two-dimensional codes in this implementation form detects the image of a data mark 061 surrounded by blank cells as shown in FIG. 28. Verification pattern 062 is used for the verification of images. On the other hand, the image of a blank cell 063 surrounded by data marks may be detected by using verification pattern 064. After verifying images, digital information is interpreted by calculating the position of cells from the position of detected images, and determining the display of cells on its position, using the same method as implementation form 1.

Figure 29:
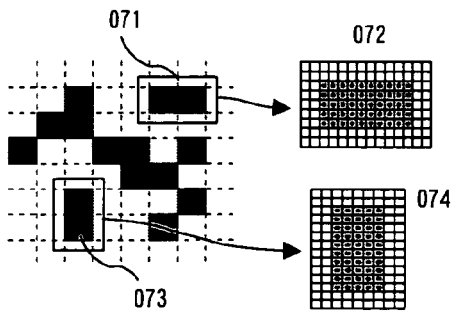
(FIG. 29) Illustration of verification pattern example 2 in implementation form 3
Figures 30, 31, 32, 33:
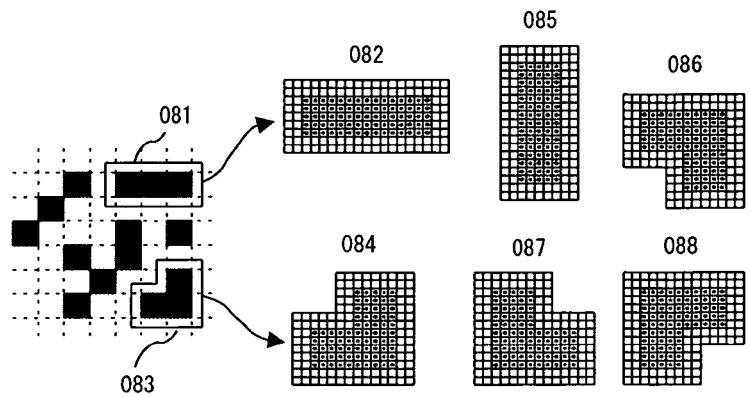
(FIG. 30) Illustration of verification pattern example 3 in implementation form 3
(FIG. 31) Illustration indicating the accuracy of reconstruction for the contrast of pixel tone between marked area and blank area (FIG. 32) Illustration indicating the accuracy of reconstruction for the distance of blank area between data marks (FIG. 33) Illustration indicating the accuracy of reconstruction for the ratio of the distance of blank area to the width of data marks

Arrangement 071 or 073, which is composed of surrounding blank cells and two successive data marks, may be detected as shown in FIG. 29. In this case, verification patterns 072 and 074 are used for the verification. Further, data marks composed of surrounding blank cells and three successive data marks may be detected as shown in FIG. 30. Other images, such as further more successive data marks and the inverse patterns of marked cells and blank cells, may be detected.

Other explanations in this implementation form are abbreviated because they are similar to implementation form 1 and implementation form 2.

Example 1

This example describes evaluation and verification of technological effects in this invention according to the accuracy of reconstruction for digital information, related to contrast between marked area and blank area and various kinds of display devices, in implementation form 1 (monochrome two-dimensional codes) and implementation form 2 (color two-dimensional codes).

As the contrast between marked area and blank area, the marked area is expressed with 6 levels between 5 and 50 in percentage of area coverage, and the blank area is expressed with 0 in percentage of area coverage. There are two examples of printed case on plain papers from an ink-jet printer (600 dpi) and displayed case on a liquid crystal device (160 dpi and 32 bits color). Then, when digital information reconstructed correctly, the evaluation result is expressed as "O". On the other hand, when digital information reconstructed incorrectly, the evaluation result is expressed as "X" as shown in FIG. 31. The following comments are recognized from FIG. 31.

The higher the contrast between marked area and blank area becomes, the higher the accuracy of reconstruction for digital information becomes.

Reconstruction in color two-dimensional codes is more difficult than reconstruction in monochrome two-dimensional code. Then, narrow range is required for color two-dimensional codes.

The case printed on recording media is more difficult than the case displayed on liquid crystal devices for reconstruction. Then, narrow range is required at the case printed on recording media.

In the case of monochrome two-dimensional codes, it is assured that the method described in this implementation form is useful as the above when the marked area is equal to or greater than 10%. Moreover, if the marked area is equal to or greater than 30%, it is possible to reconstruct digital information correctly when also printing on recording media. In the case of color two-dimensional codes, it is assured that the method described in this implementation form is useful when the marked area is equal to or greater than 30%. Moreover, if the marked area is equal to or greater than 50%, it is possible to reconstruct digital information correctly when also printing on recording media.

This chapter describes evaluation and verification when expressing data mark with various kinds of tones. Instead of the contrast between the marked area and the blank area mentioned by above example, the difference between each pixel tone of data marks is expressed with 6 levels between 5 and 50 percentages in area coverage. This result is abbreviated because it is the same as FIG. 31. The following comments are recognized from FIG. 31.

When expressing data mark with various kinds of tones, the higher the difference between each pixel tone becomes, the higher the accuracy of reconstruction for digital information becomes.

As the above, in the case of monochrome two-dimensional codes, it is assured that the method described in this implementation form is useful when the difference between tones is equal to or greater than 10%. Moreover, if the difference is equal to or greater than 30%, it is possible to reconstruct digital information correctly when also printing on recording media. In the case of color two-dimensional codes, it is assured that the method described in this implementation form is useful when the difference between tones is equal to or greater than 30%. Moreover, if the difference is equal to or greater than 50%, it is possible to reconstruct digital information correctly when also printing on recording media.

Example 2

This example describes evaluation and verification of technological effects in this invention according to the accuracy of reconstruction for digital information, related to the distance of blank area between data marks and the type of image capturing devices obtaining image data, in implementation form 2 (color two-dimensional codes).

The distance of blank area between data marks is expressed with 6 levels between 10 and 254 micro-meters. There are two examples for image capturing devices of the case of the high resolution using a flatbed scanner (600 dot per inch) and the case of the low resolution using a digital camera (0.5 mega pixels). Then, when digital information reconstructed correctly, the evaluation result is expressed as "O". On the other hand, when digital information reconstructed incorrectly, the evaluation result is expressed as "X" as shown in FIG. 32. The following comments are recognized from FIG. 32.

The larger the distance of blank area between data marks becomes, the higher the accuracy of reconstruction for digital information becomes.

Reconstruction of digital information for the image with low resolution is more difficult than the image with high resolution. Then, narrow range is required for the image with low resolution.

As the above, it is assured that the method described in this implementation form is useful when displaying data marks with the distance of the blank area being equal to or greater than 42 micro-meters between these data marks. Moreover, if the distance is equal to or greater than 127-micro-meters, it is possible to reconstruct digital information correctly when also displaying images with low resolution.

Example 3

This example describes evaluation and verification of technological effects in this invention according to the accuracy of reconstruction for digital information, related to the ratio of the distance of blank area between data marks to the width of these data marks (formula: [the distance of the blank area]/ [the width of a data mark]×100) and the type of recording media, in implementation form 2 (color two-dimensional codes).

The ratio of the distance of the blank area to the width of data marks is expressed with 10 levels between 10 and 125%. There are two examples of the case printed on glossy papers and the case printed on plain papers, using an ink-jet printer (600 dpi). Then, when digital information reconstructed correctly, the evaluation result is expressed as "O". On the other hand, when digital information reconstructed incorrectly, the evaluation result is expressed as "X" as shown in FIG. 33. The following comments are recognized from FIG. 33.

When the ratio of the distance of the blank area to the width of data marks adapts to the specified range, the accuracy of reconstruction for digital information becomes higher.

Reconstruction of digital information on the condition printed on plain papers is more difficult than the condition printed on glossy papers. Then, narrow range is required for the condition printed on plain papers.

As the above, it is assured that the method described in this implementation form is useful when displaying data marks with the ratio of the distance of the blank area to the width of these data marks being equal to or greater than 15% and being equal to or less than 100%. Moreover, if the ratio is equal to or greater than 30% and being equal to or less than 80, it is possible to reconstruct digital information correctly when also printing images on plain papers.

What is claimed is:

1. A computer-readable medium encoded with a program of instructions executable by a computer to perform a method for reading a two-dimensional code with digital information expressed by data marks displayed on a plurality of cells arrayed two-dimensionally, comprising:

detecting from an image data containing the two-dimensional code, an image pattern that is distinguished from surrounding cells by verifying an image on the image data with a verification pattern, the detected image pattern includes the image of one or more data marks and each data mark is surrounded by a blank area in each cell, wherein the detecting of the image pattern includes:

verifying the image on the image data with a verification pattern while scanning the image data; and determining the verified image according to a determining formula, and wherein:

the verification of the image on the image data is performed using a verification pattern consisting of at least two image areas defined according to assumed pixel tones; and the determining of the image on the image data is performed by assigning pixel tone values calculated in correspondence to each of the image areas of the verification pattern in the determining formula.

2. The computer-readable medium encoded with a program of instructions executable by a computer to perform a method for reading a two-dimensional code with digital information expressed by data marks displayed on a plurality of cells arrayed two-dimensionally, comprising:

detecting from an image data containing the two-dimensional code, an image pattern that is distinguished from surrounding cells by verifying an image on the image data with a verification pattern, the detected image pattern includes the image of one or more data marks and each data mark is surrounded by a blank area in each cell, wherein the detecting of the image pattern includes:

verifying the image on the image data with a verification pattern while scanning the image data and determining the verified image according to a determining formula;

calculating positions of cells that exist outside of the verified image area using a detected position of the verified image, the verified image including the data mark image;

determining a display of the cells on the calculated position; and decoding digital information expressed as the two-dimensional code based upon the determined display of the cells.

3. A computer-readable medium encoded with a program of instructions executable by a computer to perform a method for reading a two-dimensional code with digital information expressed by data marks displayed on a plurality of cells arrayed two-dimensionally, comprising:

detecting from a colored image data containing the two-dimensional code consisting of pixels each having a plurality of color components, an image pattern that is distinguished from surrounding cells by verifying an image on the colored image data with a verification pattern for each of the plurality of color components of each pixel, wherein the detected image pattern includes the image of one or more data marks, wherein the detecting of the image pattern includes:

verifying the image on the colored image data with a verification pattern while scanning the colored image data and determining the verified image according to a determining formula, and wherein:

the verification of the image on the colored image data is performed using a verification pattern consisting of at least two image areas defined according to assumed pixel tones; and the determining of the image on the colored image data is performed by assigning pixel tone values calculated in correspondence to each of the image areas of the verification pattern in the determining formula.

4. A two-dimensional code, comprising:

digital information expressed by data marks on a plurality of cells arrayed two-dimensionally, wherein the data marks on each cell are displayed in layers of a plurality of color components of an output device, with each data mark surrounded by a blank area where none of the plurality of color components of the output device is output, wherein the displaying of the data marks includes:

separating data rows that constitute the digital information by corresponding said data rows to the plurality of color components of the output device;

determining an arrangement of data marks placed on the cells for each of the separated data rows; and displaying the data marks in layers of the plurality of color components of the output device in the determined arrangement.

5. The two-dimensional code of claim 4, wherein all of the data marks on each cell further comprise an image pattern with a specific shape and size, and are displayed by coinciding marked areas of all of the color components used for display.

6. The two-dimensional code of claim 4, wherein the data marks comprise an image pattern with a specific shape and size, and the distance of the blank area between two consecutively displayed data marks is between 30% and 80% the width of the data marks.

7. The two-dimensional code of claim 4, wherein the data marks further comprise an image pattern with a specific shape and size, the distance of the blank area between two consecutively displayed data marks is greater than or equal to 127 micrometers.

8. A program of instructions executable by a computer to perform a method for reading a two-dimensional code with digital information expressed by data marks displayed on a plurality of cells arrayed two-dimensionally, the program of instructions comprising:

detecting an image pattern displayed on a specific position by verifying an image on an image data containing the two-dimensional code with a verification pattern; and obtaining image information from the image of the detected image pattern to use the image information to determine how the cells are displayed, wherein the data marks are displayed with a specific image pattern surrounded by a blank area on each cell, wherein the image information is obtained from an image of one or more reference marks displayed in the same shape and size as the data marks, wherein the obtained image information include a value obtained by statistically processing values of pixel tones of a plurality of pixels that constitute each of the image areas in at least two image areas set accordingly to assumed pixel tones.

* * * * *